United States Patent
Takashima et al.

(10) Patent No.: US 9,278,882 B2
(45) Date of Patent: Mar. 8, 2016

(54) METHOD OF PRODUCING GLASS

(75) Inventors: Kenji Takashima, Tokyo (JP); Zuyi Zhang, Yokohama (JP); Yoshinori Kotani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 13/699,977

(22) PCT Filed: May 20, 2011

(86) PCT No.: PCT/JP2011/062152
§ 371 (c)(1),
(2), (4) Date: Nov. 26, 2012

(87) PCT Pub. No.: WO2011/152289
PCT Pub. Date: Dec. 8, 2011

(65) Prior Publication Data
US 2013/0074548 A1    Mar. 28, 2013

(30) Foreign Application Priority Data

Jun. 1, 2010 (JP) ................................. 2010-126328

(51) Int. Cl.
| | |
|---|---|
| C03C 11/00 | (2006.01) |
| C03C 3/089 | (2006.01) |
| C03C 3/091 | (2006.01) |
| C03C 23/00 | (2006.01) |

(52) U.S. Cl.
CPC .................. *C03C 11/00* (2013.01); *C03C 3/089* (2013.01); *C03C 3/091* (2013.01); *C03C 11/005* (2013.01); *C03C 23/008* (2013.01)

(58) Field of Classification Search
CPC .............................. C03C 11/005; C03C 3/089
USPC .......................................................... 65/22, 31
See application file for complete search history.

(56) References Cited

U.S. PATENT DOCUMENTS

| | | | |
|---|---|---|---|
| 2,106,744 A | 2/1938 | Porter, et al. | |
| 3,374,141 A | 3/1968 | Junge et al. | |
| 3,753,840 A * | 8/1973 | Plumat | 428/174 |

(Continued)

FOREIGN PATENT DOCUMENTS

| | | | |
|---|---|---|---|
| JP | 53-084018 A | | 7/1978 |
| JP | 59227047 A | * | 12/1984 |

(Continued)

OTHER PUBLICATIONS

Non-final Office Action in U.S. Appl. No. 13/699,963 (dated Aug. 12, 2014).

(Continued)

*Primary Examiner* — Queenie Dehghan
(74) *Attorney, Agent, or Firm* — Fitzpatrick, Cella, Harper & Scinto

(57) ABSTRACT

Provided is a method of producing porous glass having pores with a uniform pore diameter entirely, particularly in the case of phase-separated glass, including selectively removing a denatured layer formed on the surface of glass easily. The method of producing glass includes: forming phase-separated glass containing silicon oxide, boron oxide, and an alkali metal oxide; bringing an alkaline solution held by a porous supporting member into contact with the denatured layer formed on the surface of the phase-separated glass to remove the denatured layer; and immersing the phase-separated glass with the denatured layer removed therefrom in an acid solution to form pores in the phase-separated glass.

5 Claims, 2 Drawing Sheets

(56) References Cited

U.S. PATENT DOCUMENTS

| | | | |
|---|---|---|---|
| 4,019,884 A * | 4/1977 | Elmer et al. ............ 65/30.1 |
| 4,080,188 A | 3/1978 | Doddato et al. |
| 4,086,074 A | 4/1978 | Minot et al. |
| 4,220,682 A | 9/1980 | Litovitz et al. |
| 4,657,875 A | 4/1987 | Nakashima et al. |
| 4,776,869 A | 10/1988 | Offenbacher et al. |
| 4,781,792 A | 11/1988 | Hogan |
| 2003/0073385 A1 | 4/2003 | Benning et al. |
| 2003/0230112 A1 | 12/2003 | Ikeda et al. |
| 2010/0255626 A1 | 10/2010 | Murai et al. |
| 2013/0045853 A1 | 2/2013 | Kotani et al. |
| 2013/0067957 A1 | 3/2013 | Zhang et al. |
| 2013/0068725 A1 | 3/2013 | Takashima et al. |
| 2013/0224494 A1 | 8/2013 | Kotani et al. |
| 2013/0233018 A1 | 9/2013 | Takashima et al. |

FOREIGN PATENT DOCUMENTS

| | | |
|---|---|---|
| JP | 62-297223 A | 12/1987 |
| JP | 64-079030 A | 3/1989 |
| JP | 1-145349 A | 6/1989 |
| JP | 11-029882 A | 2/1999 |
| JP | 2000-183026 A | 6/2000 |
| JP | 2003-073145 A | 3/2003 |
| JP | 2003-332868 A | 11/2003 |
| JP | 2004-063816 A | 2/2004 |
| WO | 2007/131635 A1 | 11/2007 |
| WO | 2009/081453 A1 | 7/2009 |
| WO | 2011/145714 A1 | 11/2011 |
| WO | 2011/152287 A2 | 12/2011 |
| WO | 2011/152288 A1 | 12/2011 |

OTHER PUBLICATIONS

"New Glass and its Physical Properties", Chapter 2, pp. 47-57 (Management System Laboratory, Co., Ltd.; edited by T. Izumiya) (1984).

Moriya et al., "Glass Engineering Handbook" (Asakura Publishing Co., Ltd.), pp. 651-655 (1963).

Final Office Action in U.S. Appl. No. 13/699,963 (mailed Jan. 20, 2015).

Non-final Office Action in U.S. Appl. No. 13/699,963 (mailed Jun. 30, 2015).

* cited by examiner

METHOD OF PRODUCING GLASS

TECHNICAL FIELD

The present invention relates to a method of producing glass.

BACKGROUND ART

A layer having a composition different from that of an inner part of glass is liable to appear on the surface of multi-component oxide glass due to the influences of water vapor and heat in the atmosphere.

For example, one of the productions of a porous glass material is to utilize a phase separation. A phase separation is generally induced by heat treatment of holding molded borosilicate glass at high temperature for a long period of time. By etching the glass with an acid solution to elute a silica-poor phase, the porous glass is obtained. A skeleton of the porous glass is mainly formed of silicon oxide. For making the porous glass material utilizing a phase separation, borosilicate glass mainly containing silicon oxide, boron oxide, and an alkali metal oxide is generally used.

However, for example, as also described in NPL 1, in a phase separation induced by holding glass at high temperature for a long period of time (hereinafter, referred to as "phase separation heating treatment") and phase separation, boron or the like on the surface of glass is partly lost to cause a composition displacement, and thus, a denatured layer is formed on the surface of the glass. The denatured layer causes a problem of inhibiting etching with an acid solution in a later process. Hence, the denatured layer is required to be removed.

For example, PTL 1 discloses a technique of removing at least 10 μm of outermost surface glass by polishing. However, with the removal by polishing, glass needs to have mechanical strength to some degree, and there may be problems such as roughening of the surface by polishing and the remaining of an abrasive in performing later processes in some cases.

PTL 2 also describes that an outermost surface glass layer of borosilicate glass is removed by a chemical method using hydrofluoric acid, ammonium hydrogen difluoride, or an alkaline glass corrosive.

PTL 3 describes a method of removing a denatured layer by a chemical procedure involving washing a denatured layer on the surface of glass with an alkaline aqueous solution. However, PTL 2 and PTL 3 do not disclose a method of selectively removing a denatured layer. Further, in the case where a denatured layer is formed on thin glass or a glass thin film, it is necessary to selectively remove only a denatured layer, which requires a new facility.

CITATION LIST

Patent Literature

PTL 1: Japanese Patent Application Laid-Open No. 562-297223
PTL 2: Japanese Patent Application Laid-Open No. 562-297223
PTL 3: Japanese Patent Application Laid-Open No. 2003-073145

Non Patent Literature

NPL 1: "New glass and its physical properties", chapter 2, pages 47-57, edited by T. Izumiya, Management System Laboratory, Co., Ltd., 1984.

SUMMARY OF INVENTION

Technical Problem

The present invention has been achieved in order to solve such problem as described above, and an object of the present invention is to provide a method of producing porous glass having pores with a uniform pore diameter entirely, particularly in the case of phase separation glass, including selectively removing a denatured layer formed on the surface of glass easily.

Solution to Problem

In order to solve the above mentioned problem, a method of producing glass of the present invention includes: forming a vitreous body containing silicon oxide, boron oxide, and an alkali metal oxide; and bringing an alkaline solution held by a porous supporting member into contact with the surface of the vitreous body to remove a denatured layer.

Further, the method of producing glass of the present invention includes: forming phase separation glass containing silicon oxide, boron oxide, and an alkali metal oxide; bringing an alkaline solution held by a porous supporting member into contact with the surface of the phase separation glass to remove the denatured layer; and immersing the phase separation glass with the denatured layer removed therefrom in an acid solution and/or water to form pores in the phase separation glass.

Advantageous Effects of Invention

According to the present invention, there can be provided the method of producing glass having pores with a uniform pore diameter entirely, particularly in the case of phase separation glass, including selectively removing a denatured layer formed on the surface of glass easily.

Further, because the method does not use a mechanical removing method such as polishing, there are no problems in mechanical strength and shape of glass. Thus, the method can be used for all purposes.

Further features of the present invention will become apparent from the following description of exemplary embodiments with reference to the attached drawings.

DESCRIPTION OF EMBODIMENTS

Hereinafter, one embodiment for carrying out the present invention is described.

Figure 1:
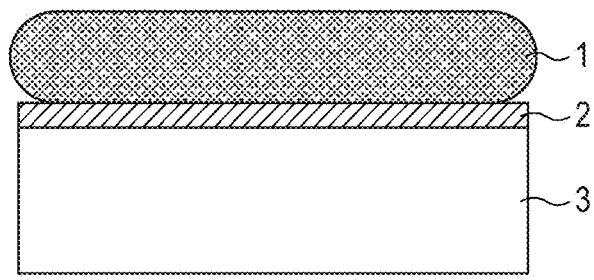
FIG. 1 is a schematic view illustrating one embodiment of a method of producing glass of the present invention.

FIG. 1 is a view illustrating one embodiment of a method of producing glass of the present invention, and illustrates a porous supporting member 1, a denatured layer 2, and a vitreous body or phase separation glass 3.

The method of producing glass according to the present invention includes bringing an alkaline solution held by a porous supporting member into contact with the surface of borosilicate glass to remove a denatured layer.

Further, the method of producing glass according to the present invention includes: forming phase separation glass containing silicon oxide, boron oxide, and an alkali metal oxide; bringing an alkaline solution held by a porous supporting member into contact with a denatured layer formed on the surface of the phase separation glass to remove the denatured layer; and immersing the phase separation glass with the denatured layer removed therefrom in an acid solution and/or water to form pores in the phase separation glass.

In the present invention, borosilicate glass is obtained by forming a vitreous body by melting a mixture containing silicon oxide, boron oxide, and an alkali metal oxide, followed by surface treatment, if required. In the case of forming phase separation glass, a process of forming phase separation glass by heating the vitreous body to effect phase separation is involved. This heating is referred to as phase separation heating in the present specification. With a particular composition, phase separation glass may be obtained without phase separation heating. In general, borosilicate glass is expressed by a weight ratio of oxides such as silicon oxide (silica, $SiO_2$), boron oxide ($B_2O_3$), and an alkali metal oxide. The borosilicate glass contains mainly silicon oxide, boron oxide, and an alkali metal oxide, and may contain, for example, aluminum oxide, calcium oxide, and magnesium oxide as other metal oxides.

In phase separation glass, borosilicate glass having a particular composition undergoes, in some cases, a phase separation in which glass is separated into a silicon oxide glass phase mainly containing silicon oxide and a borosilicate glass phase mainly containing boron oxide and an alkali metal oxide in the course of the application of heat to the vitreous body. Glass that has undergone the phase separation is referred to as phase separation glass in this description. Phase separation borosilicate glass is, for example, $SiO_2$ (55 to 80% by weight) —$B_2O_3$—$Na_2O$—($Al_2O_3$)-based glass, $SiO_2$ (35 to 55% by weight) —$B_2O_3$—$Na_2O$-based glass, $SiO_2$—$B_2O_3$—$CaO$—$Na_2O$—$Al_2O_3$-based glass, $SiO_2$—$B_2O_3$—$Na_2O$—RO (R: alkaline earth metal, Zn)-based glass, and $SiO_2$—$B_2O_3$—$CaO$—$MgO$—$Na_2O$—$Al_2O_3$—$TiO_2$ ($TiO_2$ is contained up to 49.2 mol %)-based glass.

Regarding the preferred composition as main components of a vitreous body to be used in the present invention, the content of an alkali metal oxide is generally 2% by weight or more to 20% by weight or less, particularly preferably 3% by weight or more to 15% by weight or less.

The content of boron oxide is generally 10% by weight or more to 55% by weight or less, particularly preferably 15% by weight or more to 50% by weight or less.

The content of silicon oxide is generally 45% by weight or more to 80% by weight or less, particularly preferably 55% by weight or more to 75% by weight or less.

Further, the content of metal oxides other than silicon oxide, boron oxide, and an alkali metal oxide is generally 15% by weight or less, particularly preferably 10% by weight or less.

In the case of phase separation glass, a phase separation appears generally when the glass is held at about 500° C. to 700° C. for several hours to tens of hours, and the state of expression of phase separation, and further, the pore diameter and pore density in the case where porous glass is obtained, vary depending upon the temperature and retention time.

It is ideal that the total content of silicon oxide, boron oxide, and an alkali metal oxide to be contained in the entire glass be the same before and after the phase separation heat treatment. However, a part of boron oxide and an alkali metal oxide in the vicinity of the surface of glass is lost due to the reaction with water vapor in the atmosphere or the sublimation during heat treatment, and apart from uniform phase separation formation in an inner part, a denatured layer mainly containing silicon oxide is formed on the surface.

Further, even in the case of general borosilicate glass, when the glass is subjected to surface polishing, a denatured layer mainly containing silicon oxide on the surface is formed in many cases.

The generation of a denatured layer on the surface can be confirmed by an observation procedure by a scanning electron microscope (SEM), etc., or an element analysis procedure such as X-ray photoelectron analysis (XPS), and the thickness of the denatured layer is about several hundred nanometers even when the layer is thick.

When a denatured layer is generated on the surface of glass, solid silica covers a portion in which a phase separation occurs, which adversely affects the elution and porosity of a soluble layer of phase separation glass with an acid solution, for example.

In phase-separated borosilicate glass, a borosilicate glass phase mainly containing boron oxide and an alkali metal oxide is soluble in an acid solution. Thus, the soluble phase reacts by acid treatment, and a silicon oxide glass phase mainly containing silicon oxide remains as a skeleton. Thus, porous glass having pores formed therein is formed. When a denatured layer is formed on the surface, the acid solution does not permeate the inner part of the glass in which the phase separation is effected, and even when the acid solution permeates the inner part, the elution of the soluble phase is inhibited. Thus, pores are hardly obtained.

As a mechanical method of removing a denatured layer, for example, there is given mechanical surface polishing. However, a stress is applied to glass when the surface of the glass is polished with an abrasive, and the glass, if it is fragile, may be broken. Further, it is difficult to precisely control the amount to be removed by polishing, and there is a possibility that a phase-separated uniform glass layer portion may be removed. Further, cracks may occur on the surface of glass after polishing, and the abrasive may remain.

As a chemical procedure, a denatured layer can be removed by allowing an alkaline solution to react with the surface of glass where the denatured layer is formed. This is because the alkaline solution and solid silica mainly forming the denatured layer react with each other on the surface of the glass.

When the alkaline solution is allowed to react with the denatured layer, for example, in the case where phase separation glass in which a denatured layer is formed is immersed sufficiently in a bath of an alkaline solution, the alkaline solution circulates to increase a liquid amount to be reacted per unit area of the denatured layer. Therefore, the alkaline solution not only breaks the denatured layer but also may erode and break a silicon oxide glass phase mainly containing silicon oxide which mainly forms a skeleton in a phase-separated inner part. In the alkaline solution that reacts with the denatured layer, the reactivity changes greatly depending upon the temperature, and it is very difficult to selectively remove only the denatured layer under immersing conditions.

The present invention is characterized by using a method of etching glass, including a first process of bringing an alkaline solution held by a porous supporting member into contact with a denatured layer formed on the surface of phase separation glass and leaving the resultant to remove the denatured layer, and a second process of immersing the phase-separated glass with the denatured layer removed therefrom in an acid solution and/or water to form pores in the phase-separated glass.

FIG. 1 is a schematic view illustrating one embodiment of a method of producing glass of the present invention. FIG. 1 illustrates a method of removing a denatured layer 2 by bringing a porous supporting member 1 containing an alkaline solution into contact with the denatured layer 2 formed on the surface of a vitreous body or phase-separated glass 3 and leaving the resultant. In the first process, a porous supporting member is allowed to hold a limited amount of an alkaline solution and the resultant is brought into contact with the surface of glass with a denatured layer formed thereon, and thus, the liquid amount to be reacted per unit area of the denatured layer is limited, enabling the denatured layer to be removed selectively. The reaction can be controlled merely by allowing the porous supporting member to hold the liquid amount to be reacted with at most hundreds of nanometers of the denatured layer. This can also reduce the alkaline solution to be required. Further, if necessary, the treatment temperature of a glass layer can be set in a range of −5° C. to 90° C. for adjusting the reaction speed and the holding function on the surface.

The pore diameter of the porous supporting member to be used in the present invention is preferably 1 mm or less. Further, the porous supporting member includes preferably a metal, a natural fiber, or a synthetic fiber. The kind of the alkaline solution to be used in the present invention is not limited as long as the solution reacts with and breaks solid silica mainly forming a denatured layer. For example, an alkaline solution of sodium hydroxide or potassium hydroxide is preferred. It is desired that the alkali concentration of the alkaline solution be 10% by weight or more to 40% by weight or less, preferably 20% by weight or more to 30% by weight or less.

The present invention is characterized by including a first process of allowing an alkaline solution layer to be held on the surface of glass, and a second process of immersing the glass in an acid solution and/or water. In the second process, the glass in a state in which the denatured layer has been removed from the surface in the first process can be allowed to elute selectively borosilicate glass mainly containing boron oxide and an alkali metal oxide in phase-separated glass, using an ordinary etching method of immersing the phase separated-glass in an acid solution without the inhibition by the denatured layer. As an etching solution of the acid solution, an aqueous solution of hydrochloric acid, sulfuric acid, phosphoric acid, or nitric acid is used, and allows the glass to be immersed therein to dissolve a non silica-rich phase. The acid concentration of the acid solution is 0.1 mol/L or more to 5 mol/L or less (0.1 to 5 N), preferably 0.5 mol/L or more to 2 mol/L or less (0.5 to 2 N).

Depending upon a glass composition, silica gel may be deposited in pores between skeletons of silicon oxide. If required, a method of etching in multi-stages, using acid solutions with different acidities or water can be used. The etching can also be performed at an etching temperature of room temperature to 95° C. Depending upon the composition of phase separated-glass, pores may be formed only with etching using water without using an etching solution of an acid. Further, a residual of the denatured layer broken in the first process can be prevented from being deposited on the surface by combining the second process with the first process.

It is preferred that, after immersing treatment with an acid solution, porous glass be rinsed with water for the purpose of removing an acid adhering to the porous glass and a soluble layer remaining without being eluted.

The porous structure of glass obtained after the denatured layer is removed and the etching is completed can be confirmed by an observation procedure such as SEM or a pore distribution measurement such as a mercury penetration method.

Figure 2:
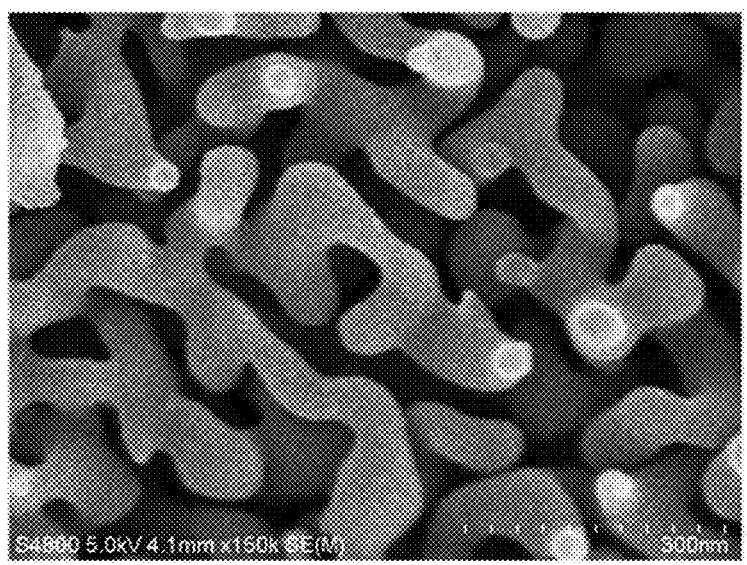
FIG. 2 is a scanning electron microscope (SEM) image of the surface of glass produced in Example 1.

Glass having pores formed therein by the method of producing glass of the present invention has a spinodal structure based on silicon oxide. The phase separations are classified into a spinodal type and a binodal type. The pores obtained by a spinodal-type phase separation are penetrating pores linked from the surface to the inside as shown in FIG. 2, for example. The structure in which the skeleton of a silicon oxide main component is continuously formed as shown in FIG. 2 is referred to as a spinodal structure based on silicon oxide. The penetrating pores linked from the surface to the inside are formed by the spinodal structure based on silicon oxide. A binodal-type phase separation provides a structure having closed pores. It has been well known that pore diameters and their distribution can be controlled depending on conditions for the heat treatment during the production of the glass. Of the phase separation phenomena, the spinodal-type phase separation that provides a porous structure having penetrating pores linked from the surface to the inside, i.e., the so-called spinodal structure is preferred.

The average pore diameter of the pores, which is not particularly limited, desirably falls within the range of 1 nm to 1 μm, particularly 2 nm to 0.5 μm, further particularly 10 nm to 0.1 μm. The glass desirably has a porosity of generally 10 to 90%, particularly 20 to 80%.

The glass having pores formed therein is expected to find use in applications such as adsorbents, microcarriers, separation films, and optical materials because its porous structure can be uniformly controlled and its pore diameters can each be changed within a certain range.

Next, examples of the present invention are described.

Hereinafter, the present invention is described more specifically by way of examples, but the present invention is not limited to the following examples.

Production Examples 1 to 7 of Glass

For examples and comparative examples of the present invention, glass was produced as Production Examples 1 to 7 with the composition in terms of oxide as shown in Table 1. As material compounds, silica powder ($SiO_2$), boron oxide ($B_2O_3$), sodium carbonate ($Na_2CO_3$), and aluminum oxide ($Al_2O_3$) were used. The mixed powder of the respective material compounds was placed in a platinum crucible and melted at 1,500° C. for 24 hours. After that, the temperature of the glass was lowered to 1,300° C., and the resultant was poured into a graphite mold. The mold was cooled in air for 20 minutes. After that, a block of the borosilicate glass thus obtained was cut to 40 mm×30 mm×1.1 mm, and both surfaces were polished to mirror finish.

Next, the vitreous body thus processed was subjected to phase separation treatment in an electric furnace under each of the conditions shown in Table 2. Thus, each glass of Production Examples 1 to 7 for examples and comparative examples was obtained.

The glass used in Examples 1 to 6 is glass described in Production Examples 1 to 5, and 7.

Example 1

Glass etching was performed using the glass of Production Example 1. A sample to be used was obtained by cutting the phase-separated glass to 2 cm×2 cm.

It was found by SEM observation that the thickness of the denatured layer of the phase-separated glass was about 200 nm. Further, it was confirmed by XPS measurement that the abundance of boron and sodium was smaller on the surface of the phase-separated glass, compared with that on a cross-section thereof, and the surface of the phase-separated glass was almost occupied with silicon and a denatured layer was present.

In the treatment in the first process using an alkali for removing a denatured layer, a potassium hydroxide aqueous solution of a concentration of 30% by weight was used as an alkaline solution. Further, the material for the porous supporting member used was rayon, and the rayon had a pore diameter of 300 nm, a density of 60 Kg/m$^3$, and a thickness of 80 μm.

First, a potassium hydroxide aqueous solution was immersed in a porous supporting member to allow the potassium hydroxide aqueous solution to permeate the porous supporting member sufficiently. The porous supporting member containing sufficiently potassium hydroxide was brought into contact with the surface of the phase-separated glass with a denatured layer formed thereon as illustrated in FIG. 1. In the atmosphere, the resultant was left to stand at room temperature for 2.5 hours.

After that, in the immersing treatment in the acid solution in the second process, 50 g of 1 mol/L (1 N) nitric acid was used as the acid solution. Nitric acid was placed in a container made of polypropylene, and previously heated to 80° C. in an oven. A sample subjected to the treatment in the first process was suspended and placed therein so as to be positioned at the center of the solution with a platinum wire. The polypropylene container was covered and left to stand at 80° C. for 24 hours. The glass subjected to the treatment with the acid solution was placed in water at 80° C. to perform rinse treatment.

It was found by SEM observation that the denatured layer was removed completely, the porous skeleton remained without being eroded, and the entire sample became porous glass. FIG. 2 is a scanning electron microscope (SEM) image of the surface of the porous glass produced in Example 1.

Example 2

An etching experiment was conducted in the same way as in Example 1 using the glass of Production Example 2. The thickness of the denatured layer was 100 nm. It was found by SEM observation of the glass after the experiment that the denatured layer was removed completely, the porous skeleton remained without being eroded, and the entire sample became porous glass.

Example 3

An experiment was conducted in the same way as in Example 1 using the glass of Production Example 3. The thickness of the denatured layer was 150 nm. It was found by SEM observation of the glass after the experiment that the denatured layer was removed completely, the porous skeleton remained without being eroded, and the entire sample became porous glass.

Example 4

An experiment was conducted in the same way as in Example 1 using the glass of Production Example 3. The thickness of the denatured layer was 100 nm. It was found by SEM observation of the glass after the experiment that the denatured layer was removed completely, the porous skeleton remained without being eroded, and the entire sample became porous glass.

Example 5

An experiment was conducted in the same way as in Example 1 using the glass of Production Example 3. The thickness of the denatured layer was 50 nm. It was found by SEM observation of the glass after the experiment that the denatured layer was removed completely, the porous skeleton remained without being eroded, and the entire sample became porous glass.

Example 6

The glass of Production Example 7 was used. When the glass was irradiated with laser light, no phase separation was confirmed. An experiment was conducted in the same way as in Example 1. The thickness of the denatured layer was 50 nm. It was found by SEM observation of the glass after the experiment that the denatured layer was removed completely.

Comparative Example 1

The glass of Production Example 1 was cut to a size of 1 cm×1 cm and used.

Regarding the phase-separated glass in which the denatured layer was present, the second process involving immersing the glass in an acid solution was performed without performing the first process involving allowing a porous supporting member to contain an alkaline solution. In the immersing treatment in the acid solution, 50 g of 1 mol/L (1 N) nitric acid was used as the acid solution. Nitric acid was placed in a container made of polypropylene and previously heated to 80° C. in an oven. A sample was suspended and placed therein with a platinum wire so as to be positioned at the center of the solution. The polypropylene container was covered and left to stand at 80° C. for 24 hours. The glass treated with the acid solution was placed in water at 80° C. and then rinse treatment was performed.

Figure 3:
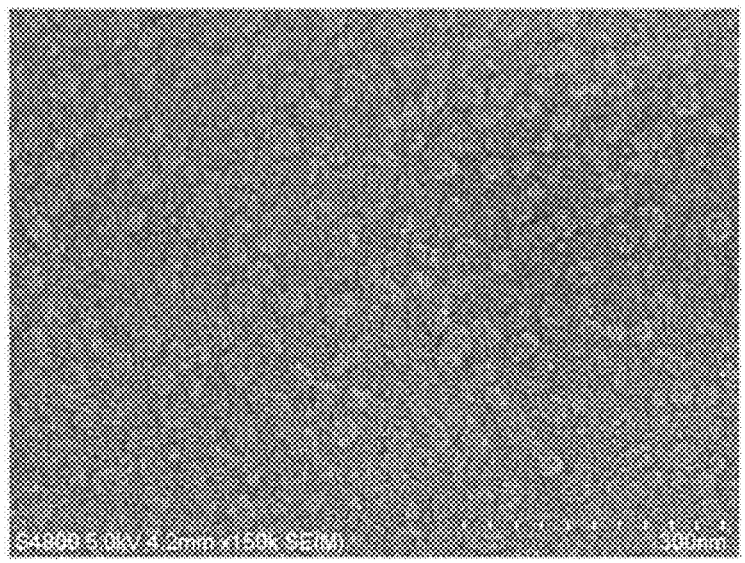
FIG. 3 is a scanning electron microscope (SEM) image of the surface of glass produced in Comparative Example 1.

It was confirmed by SEM observation that the denatured layer remained on the surface of the glass after the treatment. Further, the glass after the treatment was cut and the cut surface was observed by SEM. Then, it was confirmed that a soluble layer of the phase-separated glass remained in a portion where the denatured layer remained, which prevented the treatment with an acid solution. FIG. 3 is a scanning electron microscope (SEM) image of the surface of the porous glass produced in Comparative Example 1.

Comparative Example 2

The glass of Production Example 1 was cut to a size of 1 cm×1 cm and used.

Regarding the phase-separated glass in which the denatured layer was present, the phase-separated glass was immersed in an alkaline solution bath without using a porous supporting member in the first process involving bringing the phase-separated glass into contact with the alkaline solution. The alkaline solution to be used herein is a potassium hydroxide aqueous solution of a concentration of 30% by weight. Then, 50 g of alkaline solution was placed in a polypropylene container, and the phase-separated glass was suspended and placed therein so as to be positioned at the center of the solution with a platinum wire under the condition that the solution was heated to 80° C. for the purpose of accelerating a reaction. After the phase-separated glass was left to stand for 1 hour, the immersing treatment with an acid solution was performed as the second process.

In the immersing treatment in the acid solution in the second process, 50 g of 1 mol/L (1 N) nitric acid was used as the acid solution. Nitric acid was placed in a container made of polypropylene and previously heated to 80° C. in an oven. A sample subjected to the treatment in the first process was suspended and placed therein so as to be positioned at the center of the solution with a platinum wire. The polypropylene container was covered and left to stand at 80° C. for 24 hours. The glass subjected to the treatment with the acid solution was placed in water at 80° C. to perform rinse treatment.

Figure 4:
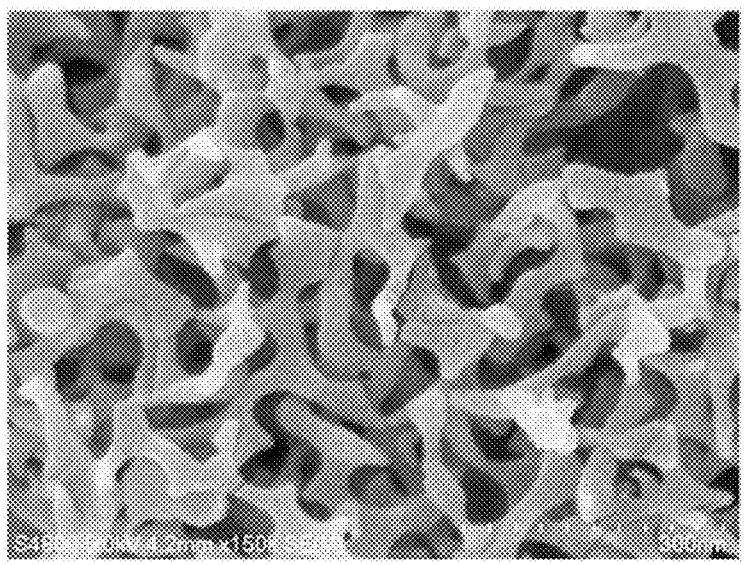
FIG. 4 is a scanning electron microscope (SEM) image of the surface of glass produced in Comparative Example 2.

After the treatment, it was found by SEM observation of the surface of the glass that the skeleton of a porous portion was also eroded by an alkali while the denatured layer was removed. FIG. 4 is a scanning electron microscope (SEM) image of the surface of the porous glass produced in Comparative Example 2.

Comparative Example 3

The glass of Production Example 6 was cut to a size of 1 cm×1 cm and used, and an experiment was performed in the same way as in Comparative Example 1.

In the same way as in Comparative Example 1, it was confirmed by SEM observation that the denatured layer remained on the surface of the glass after the treatment. Further, the glass after the treatment was cut, and the cut surface was observed by SEM. Then, it was confirmed that a soluble layer of the phase-separated glass remained in the portion where the denatured layer remained, which prevented the treatment with an acid solution.

Comparative Example 4

The glass of Production Example 6 was cut to a size 1 cm×1 cm and used, and an experiment was performed in the same way as in Comparative Example 2.

After the treatment, it was found by SEM observation of the surface of the glass that the skeleton of a porous portion was also eroded by an alkali while the denatured layer was removed in the same way as in Comparative Example 2.

TABLE 1

| Glass name | $SiO_2$ wt % | $B_2O_3$ wt % | $Na_2O$ wt % | $Al_2O_3$ wt % |
| --- | --- | --- | --- | --- |
| Production Example 1 | 63 | 28 | 9 | — |
| Production Example 2 | 63 | 27 | 7 | 3 |
| Production Example 3 | 59 | 30.5 | 9 | 1.5 |
| Production Example 4 | 75 | 19 | 4.5 | 1.5 |
| Production Example 5 | 69 | 25 | 4.5 | 1.5 |
| Production Example 6 | 63 | 28 | 9 | — |
| Production Example 7 | 65 | 24 | 11 | — |

TABLE 2

| Glass name | Phase separation treatment temperature ° C. | Phase separation treatment time H |
| --- | --- | --- |
| Production Example 1 | 600 | 50 |
| Production Example 2 | 560 | 50 |
| Production Example 3 | 560 | 50 |
| Production Example 4 | 600 | 50 |
| Production Example 5 | 600 | 25 |
| Production Example 6 | 600 | 25 |
| Production Example 7 | 500 | 24 |

TABLE 3

| | Glass to be used | Thickness of denature layer (nm) | Removal denature layer | Erosion of skeleton | Pore diameter (nm) |
| --- | --- | --- | --- | --- | --- |
| Example 1 | Production Example 1 | 200 | removed | not eroded | 100 |
| Example 2 | Production Example 2 | 100 | removed | not eroded | 50 |
| Example 3 | Production Example 3 | 150 | removed | not eroded | 30 |
| Example 4 | Production Example 4 | 100 | removed | not eroded | 40 |
| Example 5 | Production Example 5 | 50 | removed | not eroded | 60 |
| Example 6 | Production Example 7 | 50 | removed | — | — |
| Comparative Example 1 | Production Example 1 | 200 | not removed | — | — |
| Comparative Example 2 | Production Example 1 | 200 | removed | eroded | — |
| Comparative Example 3 | Production Example 6 | 100 | not removed | — | — |
| Comparative Example 4 | Production Example 6 | 100 | removed | eroded | — |

INDUSTRIAL APPLICABILITY

According to the method of producing glass of the present invention, a denatured layer on the surface of borosilicate glass can be removed selectively, and in the production of porous glass, a denatured layer on the surface of phase separation borosilicate glass can be removed selectively, and thus, porous phase separation silica can be produced without breaking a silica skeleton of a phase separation structure while keeping a strong silica skeleton. The present invention can be utilized for washing/etching of a substrate of ordinary borosilicate glass, and in phase-separated glass, the glass can be made porous while keeping the smoothness of the surface. Thus, the present invention can be utilized in a field in which phase-separated glass is used for a separation film or an optical material.

While the present invention has been described with reference to exemplary embodiments, it is to be understood that the invention is not limited to the disclosed exemplary embodiments.

This application claims the benefit of Japanese Patent Application No. 2010-126328, filed Jun. 1, 2010, which is hereby incorporated by reference herein in its entirety.

The invention claimed is:
1. A method of producing glass comprising:
   forming phase-separated glass containing silicon oxide and a denatured layer formed on a surface of the phase-separated glass, the denatured layer being compositionally deviated from a vitreous body,
   removing the denatured layer selectively in its thickness direction by bringing an alkaline solution held by a porous supporting member into contact with the denatured layer; and
   immersing the phase-separated glass with the denatured layer removed therefrom in an acid solution and/or water to form pores in the phase-separated glass,
   wherein the removing of the denatured layer selectively comprises controlling removal in the thickness direction by allowing the alkaline solution to be held by the porous supporting member to thereby restrain circulation of the alkaline solution so as to limit a liquid amount of the alkaline solution to react with the denatured layer.

2. The method of producing glass according to claim 1, wherein an acid concentration of the acid solution is 0.1 mol/L or more to 5 mol/L or less.

3. The method of producing glass according to claim 1, wherein the porous supporting member has a pore diameter of 1 mm or less.

4. The method of producing glass according to claim 1, wherein the porous supporting member comprises a metal, a natural fiber, or a synthetic fiber.

5. The method of producing glass according to claim 1, wherein an alkali concentration of the alkaline solution is 10% by weight or more to 40% by weight or less.

* * * * *